United States Patent [19]
Freundlich

[11] Patent Number: 4,507,338
[45] Date of Patent: Mar. 26, 1985

[54] CONTAINER COMPRISING A POLYSULFONE RESIN LAYER WITH A CELLULAR RESIN CORE

[75] Inventor: Richard A. Freundlich, Exton, Pa.

[73] Assignee: Polymer Projections, Inc., Flourtown, Pa.

[21] Appl. No.: 509,344

[22] Filed: Jun. 30, 1983

[51] Int. Cl.³ .................... B32B 1/02; B32B 3/26; B32B 27/08
[52] U.S. Cl. .................... 428/35; 428/215; 428/319.7; 428/419
[58] Field of Search .......... 428/317.5, 317.7, 319.9, 428/35, 215, 216, 319.3, 319.7, 314.4, 314.8, 316.6, 419

[56]  References Cited
U.S. PATENT DOCUMENTS

| | | | |
|---|---|---|---|
| 3,041,220 | 6/1962 | Martin et al. | 428/319.7 |
| 3,507,730 | 4/1970 | Gambill et al. | 428/441 |
| 3,616,162 | 10/1971 | Noziere | 428/313.5 |
| 3,637,459 | 1/1972 | Parish et al. | 428/319.7 |
| 3,654,012 | 4/1972 | Schlager | 428/319.7 |
| 4,013,810 | 3/1977 | Long | 428/319.7 |
| 4,208,469 | 6/1980 | Dial | 428/319.7 |
| 4,363,848 | 12/1982 | Le Duc et al. | 428/319.9 |

Primary Examiner—William J. Van Balen
Attorney, Agent, or Firm—Laughlin & Markensohn

[57] ABSTRACT

This invention relates to the use of two or more polymeric materials combined together forming a composite, layered structure for use in microwave oven cookware or similar types of application.

9 Claims, 8 Drawing Figures

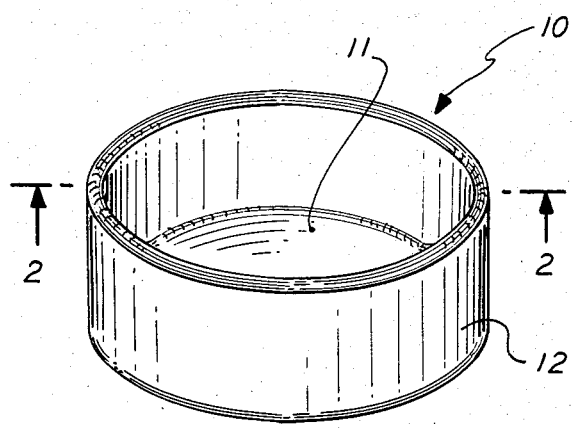
FIG. 1
FIG. 2
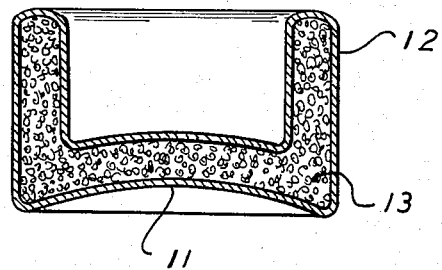
FIG. 3
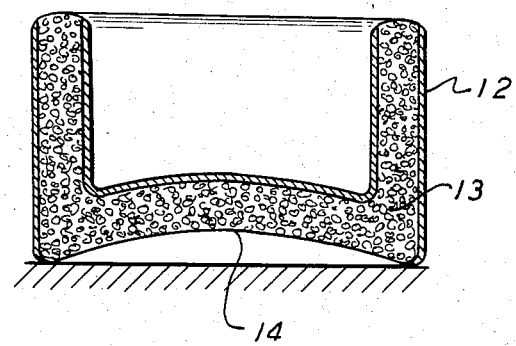
FIG. 4
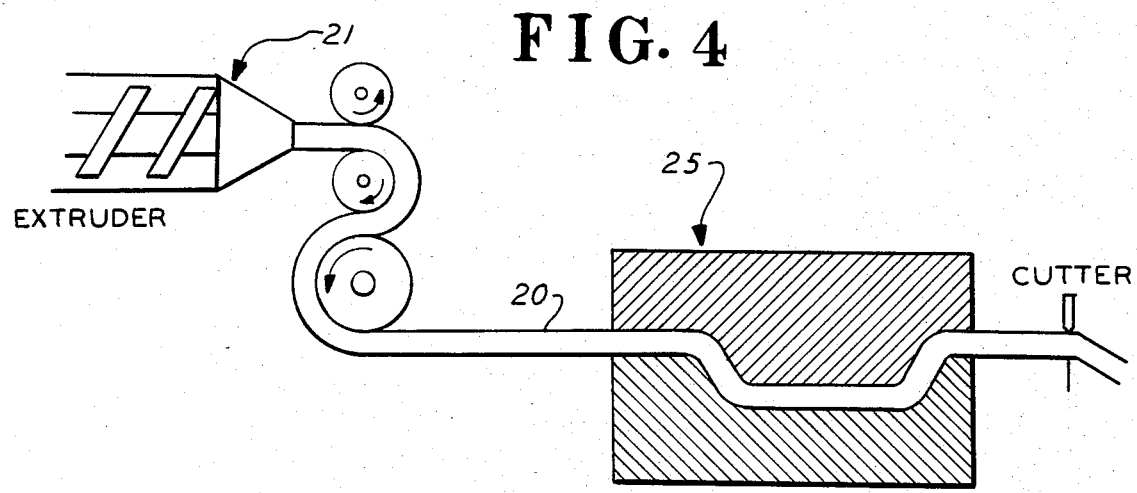

CONTAINER COMPRISING A POLYSULFONE RESIN LAYER WITH A CELLULAR RESIN CORE

BACKGROUND OF THE INVENTION

This invention relates to the use of two or more polymeric materials combined together to form a composite, layered structure for use in microwave oven cookware or similar applications.

The suitability of plastics for use in microwave cookware depends on many factors. The characteristics which determine a polymer response to a microwave field are the dielectric properties, i.e. dielectric constant and dissipation factor. The dielectric constant is a measure of a material's ability to store an electric charge. The constant is the ratio of a condenser made from the material in question to the capacity of an identical condenser using air. The dielectric constant varies with frequency, temperature and humidity. The dissipation factor is the ratio of the inphase power to the 90° out-of-phase power. The dissipation factor is the measure of the conversion of the reactive power, which is displayed in heat. The greater the dielectric constant and dissipation factor, the higher the dielectric loss, which results in greater and faster heatup in a microwave field.

Materials with softening temperatures of less than 100° C. have not been able to withstand continued exposure to microwave energy in the so called "unloaded state" This state is when the cookware is placed in the oven without any food to be heated and the oven turned on. The minimum temperature reaction is the boiling point of water i.e. 212° F. When in use, the oils, fats, grease and sugars can reach temperatures as high as 450° F. These severe conditions preclude traditional thermoplastic materials such as polypropylene, polyethylene or polystyrene from having general purpose in microwave ovens.

The primary thermoplastic material used in microwave applications is polysulfone marketed by Union Carbide under the registered trademark UDEL. This resin is used because it has high continuous use temperature (300° F.), steam resistance, long term resistance to creepe, good mechanical and electric properties, resistance to acids and alkalis in compliance with food contact regulations. Typical properties of polysulfone are as follows:

| Density | 1.24 | gms/cc |
|---|---|---|
| Tensile Strength | 10,200 | psi |
| Tensile Elongation | 50–100 | % |
| Modulus | 390,000 | psi |
| Izod Impact | 1.3 | ft. lbs./in notch |
| HDT | 345 | at 264 psi (°F.) |
| Dielectric Constant | 3.07 | 72° F. at 60-MH |
| Dissipation Factor | 0.0008–0.0034 | 72° F. |

The major disadvantage of polysulfone is its relatively high cost.

U.S. Pat. No. 3,821,015 issued June 28, 1974 to R. S. Feinberg discloses a process for improving the vapor barrier characteristics of a food handling utensil. The utensil is formed of paper or a thermoset crosslinked resin having a coating of a non-aqueous solution comprising a solvent and a linear polyamide-imide homopolymer or a polysulfone resin. After application of the coating, it is then heated to a temperature sufficient to dry the coating. The coating prevents the release of gases and vapors from the inner layer. These coating materials are semicrystalline and have distinct disadvantages, in that they are prone to induce crystallinity in repeated heat cycling in use and therefore have a short service life. U.S. Pat. No. 4,183,435, issued Jan. 15, 1980 to Thompson and Ihde discloses a polymeric multi-layered sheet material for making containers for food products. This structure has a thick cover of foamed high density polyethylene terephthalate. These core materials are semicrystalline and have limited dimensional stability.

OBJECTS OF THE INVENTION

One of the primary objects of the invention is to provide a utensil or container suitable for use in microwave ovens which is relatively transparent to microwaves. Another object is to provide such a container which is rugged and light in weight. A further object is to provide a structure which is uneffected by steam. A further object of the invention is to provide the ability to fabricate thick walled articles without adding excessive cycle processing costs. A still further object is to provide a container that will permit microwaves to pass through the walls of the container and cook the food contained therein while insulating the food to reduce loss of heat by convection. Other objects and the advantages of the invention will appear from the following description.

DESCRIPTION OF THE DRAWINGS

FIG. 1 is a top front perspective view of a preferred embodiment of the present invention.

FIG. 2 is a sectional view taken along lines 2—2 in FIG. 1.

FIG. 3 is a sectional view of a second type of structure wherein a thin layer of polysulfone resin is only on the outer service of the container and not on the base.

FIGS. 4 & 5 are flow diagrams of one method of producing the containers of the invention.

SUMMARY OF THE INVENTION

Figure 5:
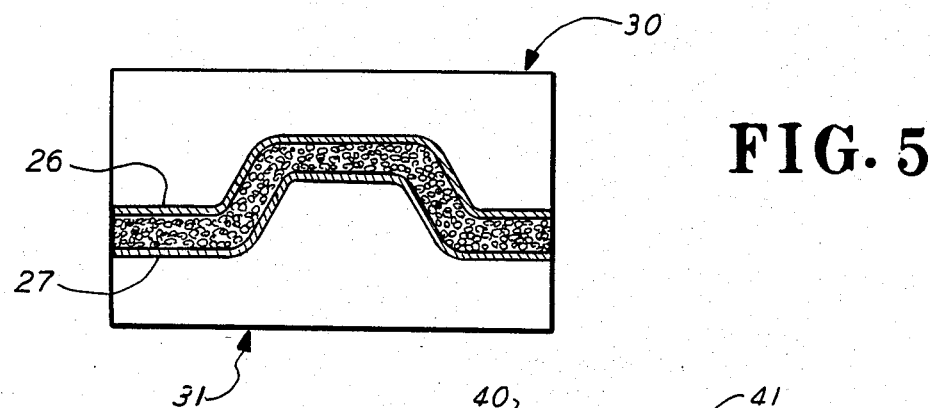

In accordance with the invention it has been discovered that a composite structure can be produced which allows use in a microwave oven of many of the conventional types of resins. The composite structure consists of an outer layer of an amphorous polysulfone resin and an inner core of cellular, foamed resin.

The composite structure of the invention permits the use of a very thin skin or outer layer of a high modulus, chemically resistant material with a lower cost inner core material. This combination takes advantage of the synergistic effects of combining two different materials into an "I" beam configuration whereby the majority of the material is placed in the flanges which are situated farthest from the center of bending or neutral axis. This results in a higher moment inertia whereby deflection of the beam structure varies inversely with the bending stiffness. In the structure of the invention the foamed core material alone cannot withstand the high temperature encountered during sustained use, but the composite structure makes the overall product perform satisfactorily. The polysulfone outer layer is usually from 0.0005 to about 0.040 inch in thickness and preferably from about 0.001 to about 0.002 inch in thickness.

The core of the composite structure is a resin formed into a cellular construction. The preferred resin is a styrene or styrenic copolymer which has a minimum softening range of about 100° C. and above. The styrenic copolymer may be based in while or in part of styrene or other vinylaromatic monomers such as paramethyl tyrene, chlorostyrene, bromostyrene, alpha-methyl styrene or vinyl tolulene. The nonstyrenic comonomer must be an unsaturated vinyl monomer which can be copolymerized with styrene. Of particular use are alpha and beta-ethylinically unsaturated carboxylic acids with their esters, anhydrides, orimides and alkyl, aminoalkyl and hydroxyalkyl esters such as methacrylic acids, itaconic acid and maleic anhydride. The carboxylic acids such as maleic anhydride increase the heat resistance of a styrenic polymer. The carboxylic acid anhydrides can be citraconic acid anhydride, aconitic anhydride, itaconic anhydride, maleic anhydride and mixtures of these anhydrides. Further, imides of any of these anhydrides are also suitable. Maleimides, N-alkyl maleimides or any N-substituted maleimides, maleic diamide, bis (N-methyl) meleic diamide increases the heat resistance of styrenic copolymers. A particularly effective copolymer is the combination of about 18% maleic anhydride and the remainder styrene.

The resinous material forming the core of the composite of the invention can be foamed in any of the well known methods in the prior art. It is preferred that the density of the foam be from about 10 to about 30 pounds per cubic foot. A particularly useful resin is a copolymer of styrene and maleic anhydride sold by Arco Chemical Company under the designation DY-THERM® X218. Other resins can also be used in the inner core material such as polyolefins, polyesters, polyamides, acetals, polyethers, polyimides, vinyl polymers and acrylics. The thickness of the foamed layer will depend on a number of factors such as insulating properties desired, strength of the product and size of the container. Generally thickness of about 0.25 to about 1.0 inch are preferred. Foamed structures for the inner core also have the advantage of allowing increasing the stiffness to weight ratio and improve the electrical characteristics needed for microwave use.

In accordance with the invention commercially available pellets of polysulfone such as UDEL grade P-1700 manufactured by Union Carbide Company are fabricated into a sheet of a thickness of about 0.015 inch, using compression molding techniques. Such techniques include extruding, calendering or injection molding. A sheet of foamed copolymer of styrene and maleic anhydride copolymer such as DYTHERM® X218 sold by Arco Chemical Company of approximately 0.375 inches in thickness is particularly effective. The two sheets can be laminated together using a solvent bond of tetrahydrofuran by applying a thin layer of the solvent to each surface to be bonded. As an alternate procedure, the foamed, cellular copolymer may be enveloped in the polysulfone by molding.

The composite formed is unique in that it is lightweight, transparent to microwaves, insulates the food after cooking to enable it to retain its heat, is low in cost and gives a great deal of design flexibility. Further, it is hydrolytically stable which gives the product long term corrosion resistance.

DESCRIPTION OF THE PREFERRED EMBODIMENT

Referring to FIGS. 1 and 2 of the drawings which illustrate one embodiment of the invention, the reference numeral 10 generally designates the food container which is an open topped round heating dish or tray having a bottom which slopes upward toward the center. It should be understood that the container 10 may assume any desired shape or size and can be used with a cover. The container generally indicated at 10 includes a circular base 11 which is convex and integrally formed side wall 12 flaring upwardly from the peripheral of base 11.

The body or main structural core of the container 10 is a structurally self-supporting, integrally formed foam resin core 13, which is completely covered along the opposite face and edge thereof by a film or layer 14 of an amorphous polysulfone resin. It is essential to this invention that the polysulfone film cover all of the surface to be exposed to the microwaves. A modification of the container is illustrated in FIG. 3 wherein the outer film 12 does not cover the base 14 of the container.

One method of preparing the container of the invention is shown in FIGS. 4 & 5. A polysulfone sheet 20 is formed by extrusion from an extruder generally indicated at 21 and then fed into a mold generally indicated at 25 which forms the sheet 20 into the form of container desired. Two sheets 26, 27, one forming the upper skin and the other a lower skin are placed in a mold generally indicated at 30 and 31 and beads of the polymer material to form the inner core are placed between the two skins. Steam is then used to heat the beads causing them to expand and form the cellular core. The finished container is then removed from the mold.

Figure 6:
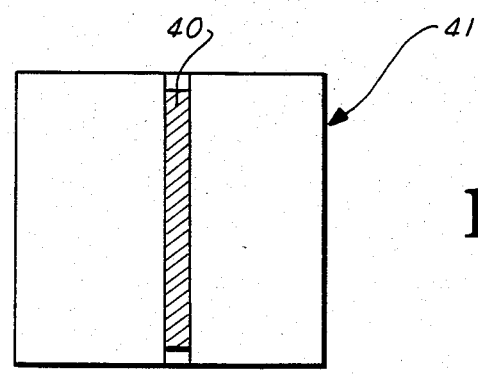
FIGS. 6 & 7 are flow diagrams of a second method of producing the containers of the invention.
Figure 7:
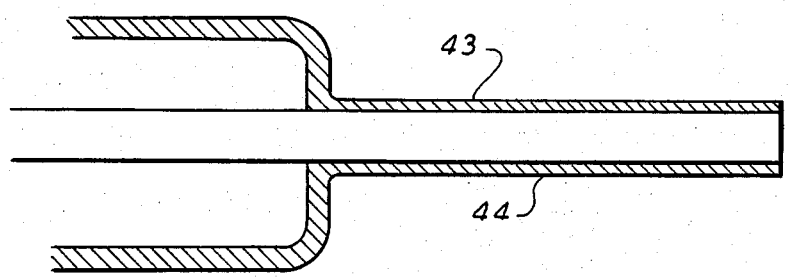
Figure 8:
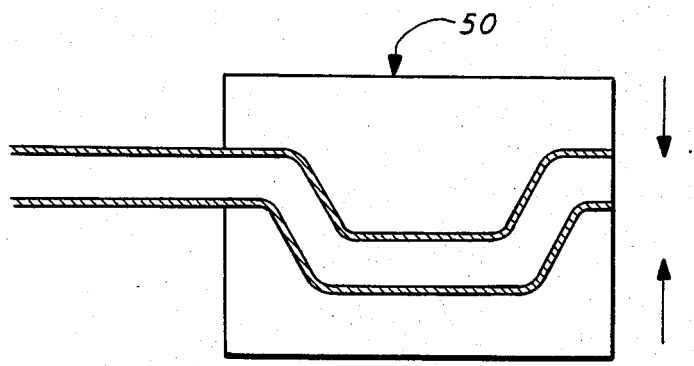

An alternate method of preparing the container of the invention is shown in FIGS. 6 & 7. A flat, cellular foam sheet 40 is formed by placing beads of the polymer to be used for the core in a mold generally indicated into at 41 and then subjecting the beads to steam to form the cellular form sheet 40. The sheet 40 is then fed into a die sandwiched between two extruded polysulfane sheets 43, 44. The product produced has a layer of polysulfane on each side of the foam core, is then fed to a die generally indicated at 50 which applies heat and pressure forming the composite into the desired container shape.

Another method of forming the container of this invention is to form the outer shell or skin by thermoforming or injection molding. The inner surface of the shell is then sprayed with a solvent such as tetrahydrofurane. This skin is then placed in a mold on either side of a foam core. Pressure is applied to laminate the skin to the formed core.

The use of the utensils of the invention is not limited to microwave cookware. They also have application for a variety of industrial end uses wherein structural composites are required which also have excellent electrical properties. A typical other use would be as a shield for microwave antennas.

While the invention has been described with reference to its preferred embodiment thereof, it will be appreciated by those of ordinary skill in the art that various changes can be made without departing from the scope of the invention and such modifications are intended to be included within the scope of the claims.

What is claimed is:

1. A container for food products transparent to microwaves for use in a microwave oven having a cellular inner core of about 0.25 to about 1.0 inch in thickness composed of a resin having a softening point of over about 100° C., and a thin, non-foamed outer covering of from about 0.0005 to about 0.040 inch in thickness, of an amorphous, thermoplastic polysulfone resin.

2. The container of claim 1 wherein said cellular resin is a copolymer of styrene and maleic anhydride.

3. The container of claim 1 wherein said inner core material is a copolymer of styrene and about 18% maleic anhydride.

4. The container of claim 1 wherein said outer layer has a thickness of from about 0.0005 to about 0.040 inch, and said inner core has a thickness of from about 0.25 to about 1.0 inch and a density of from about 10 to about 30 pounds per cubic foot.

5. The container of claim 1 wherein said outer layer has a thickness of about 0.001 to about 0.002 inch, and said inner core has a thickness of about 0.25 to about 1.0 inch and a density of from about 10 to about 30 pounds per cubic foot.

6. The container of claim 1 wherein the outer sheet and inner sheet are bonded together by a solvent.

7. The container of claim 1 wherein the outer sheet and inner sheet are bonded together by the application of tetrahydrofuran.

8. The container of claim 1 wherein the inner and outer sheets are bonded together by heat sealing of the surface of each sheet.

9. The container of claim 1 wherein the composite sheet is formed by extrusion of the core layer and outer layer.

* * * * *